US009784288B2

(12) United States Patent
Six

(10) Patent No.: US 9,784,288 B2
(45) Date of Patent: *Oct. 10, 2017

(54) ENERGY HARVESTING PASSIVE AND ACTIVE SUSPENSION

(71) Applicant: Tenneco Automotive Operating Company Inc., Lake Forest, IL (US)

(72) Inventor: Kristoff Six, Hasselt (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 250 days.

This patent is subject to a terminal disclaimer.

(21) Appl. No.: 14/616,112

(22) Filed: Feb. 6, 2015

(65) Prior Publication Data
US 2015/0152888 A1    Jun. 4, 2015

Related U.S. Application Data

(63) Continuation of application No. 13/286,457, filed on Nov. 1, 2011, now Pat. No. 8,966,889.

(51) Int. Cl.
*F16D 31/02* (2006.01)
*F15B 1/027* (2006.01)
*F15B 1/02* (2006.01)
*B60G 17/04* (2006.01)
*F15B 1/04* (2006.01)

(52) U.S. Cl.
CPC .......... *F15B 1/027* (2013.01); *B60G 17/0416* (2013.01); *F15B 1/021* (2013.01); *F15B 1/04* (2013.01); *B60G 2300/60* (2013.01); *F15B 2211/212* (2013.01); *F15B 2211/30575* (2013.01); *F15B 2211/88* (2013.01)

(58) Field of Classification Search
CPC .............................. F15B 1/027; B60G 17/0416

USPC ......... 280/124.1, 124.112, 124.157; 180/165
See application file for complete search history.

(56) References Cited

U.S. PATENT DOCUMENTS

| 3,893,702 A | 7/1975 | Keijzer et al. |
| 3,917,309 A | 11/1975 | Hegel et al. |
| 3,954,256 A | 5/1976 | Keijzer et al. |
| 3,979,134 A | 9/1976 | Keijzer et al. |
| 4,743,046 A | 5/1988 | Schnittger |
| 5,215,327 A | 6/1993 | Gatter et al. |
| 5,222,759 A | 6/1993 | Wanner et al. |
| 5,269,556 A | 12/1993 | Heyring |

(Continued)

FOREIGN PATENT DOCUMENTS

| DE | 102010007237 | 9/2010 |
| EP | 1878598 A1 | 1/2008 |
| KR | 20010011034 A | 2/2001 |

OTHER PUBLICATIONS

Search Report and Written Opinion dated Mar. 25,2013 issued in corresponding PCT application No. PCTUS2012/059324 (10 pages).

(Continued)

*Primary Examiner* — Michael Leslie
*Assistant Examiner* — Daniel Collins
(74) *Attorney, Agent, or Firm* — Harness, Dickey & Pierce, P.L.C.

(57) ABSTRACT

A hydraulic actuator includes an energy recuperation device which harvests the energy generated from the stroking of a shock absorber. The energy recuperation device can function in a passive energy recovery mode for the shock absorber to store recovered energy as fluid pressure or it can be converted to another form of energy such as electrical energy.

21 Claims, 12 Drawing Sheets

(56) References Cited

U.S. PATENT DOCUMENTS

| | | |
|---|---|---|
| 5,447,332 A | 9/1995 | Heyring et al. |
| 5,480,188 A | 1/1996 | Heyring et al. |
| 5,556,115 A | 9/1996 | Heyring |
| 5,562,305 A | 10/1996 | Heyring et al. |
| 5,601,306 A | 2/1997 | Heyring et al. |
| 5,601,307 A | 2/1997 | Heyring et al. |
| 5,682,980 A | 11/1997 | Reybrouck |
| 5,725,239 A | 3/1998 | de Molina |
| 5,785,344 A | 7/1998 | Vandewal et al. |
| 5,839,741 A | 11/1998 | Heyring |
| 5,915,701 A | 6/1999 | Heyring |
| 5,934,422 A | 8/1999 | Steed |
| 6,010,139 A | 1/2000 | Heyring et al. |
| 6,111,375 A | 8/2000 | Zenobi |
| 6,217,047 B1 | 4/2001 | Heyring et al. |
| 6,270,098 B1 | 8/2001 | Heyring et al. |
| 6,338,014 B2 | 1/2002 | Heyring et al. |
| 6,519,517 B1 | 2/2003 | Heyring et al. |
| 6,588,777 B1 | 7/2003 | Heyring |
| 6,669,208 B1 | 12/2003 | Monk et al. |
| 6,761,371 B1 | 7/2004 | Heyring et al. |
| 7,040,631 B2 | 5/2006 | Kotulla et al. |
| 7,321,816 B2 | 1/2008 | Lauwerys et al. |
| 7,350,793 B2 | 4/2008 | Munday |
| 7,384,054 B2 | 6/2008 | Heyring et al. |
| 7,386,378 B2 | 6/2008 | Lauwerys et al. |
| 7,637,513 B2 | 12/2009 | Kotulla et al. |
| 7,686,309 B2 | 3/2010 | Munday et al. |
| 7,751,959 B2 | 7/2010 | Boon et al. |
| 7,789,398 B2 | 9/2010 | Munday et al. |
| 8,672,337 B2 | 3/2014 | van der Knaap et al. |
| 8,820,064 B2 | 9/2014 | Six et al. |
| 8,966,889 B2 | 3/2015 | Six |
| 9,108,484 B2 | 8/2015 | Reybrouck |
| 2007/0089924 A1 | 4/2007 | de la Torre et al. |
| 2008/0257626 A1 | 10/2008 | Carabelli et al. |
| 2010/0006362 A1 | 1/2010 | Armstrong |
| 2010/0072760 A1 | 3/2010 | Anderson et al. |
| 2014/0190156 A1 | 7/2014 | Reybrouck |
| 2015/0152888 A1 | 6/2015 | Six |

OTHER PUBLICATIONS

Office Action dated Sep. 15, 2015 in corresponding Chinese application No. 201280052390.6 with English translation.

ENERGY HARVESTING PASSIVE AND ACTIVE SUSPENSION

CROSS REFERENCE TO RELATED APPLICATIONS

The present disclosure is a continuation of U.S. application Ser. No. 13/286,457, filed Nov. 1, 2011 and presently allowed, the entire disclosure of which is hereby incorporated by reference into the present application.

FIELD

The present disclosure is directed to passive and active suspension systems. More particularly, the present disclosure is directed to passive and active suspension systems that harvest the energy generated during the damping of the suspension system.

BACKGROUND

This section provides background information related to the present disclosure which is not necessarily prior art.

Suspension systems are provided to filter or isolate the vehicle's body (sprung portion) from the vehicle's wheels and axles (unsprung portion) when the vehicle travels over vertical road surface irregularities as well as to control body and wheel motion. In addition, suspension systems are also used to maintain an average vehicle attitude to promote improved stability of the vehicle during maneuvering. The typical passive suspension system includes a spring and a damping device in parallel with the spring which are located between the sprung portion and the unsprung portion of the vehicle.

Hydraulic actuators, such as shock absorbers and/or struts, are used in conjunction with conventional passive suspension systems to absorb unwanted vibration which occurs during driving. To absorb this unwanted vibration, hydraulic actuators include a piston located within a pressure cylinder of the hydraulic actuator. The piston is connected to the sprung portion or body of the vehicle through a piston rod. Because the piston is able to restrict the flow of damping fluid within the working chamber of the hydraulic actuator when the piston is displaced within the pressure cylinder, the hydraulic actuator is able to produce a damping force which counteracts the vibration of the suspension. The greater the degree to which the damping fluid within the working chamber is restricted by the piston, the greater the damping forces which are generated by the hydraulic actuator.

In recent years, substantial interest has grown in automotive vehicle suspension systems which can offer improved comfort and road handling over the conventional passive suspension systems. In general, such improvements are achieved by utilization of an "intelligent" suspension system capable of electronically controlling the suspension forces generated by hydraulic actuators.

Different levels in achieving the ideal "intelligent" suspension system called a semi-active or a fully active suspension system are possible. Some systems control and generate damping forces based upon the dynamic forces acting against the movement of the piston. Other systems control and generate damping forces based on the static or slowly changing dynamic forces, acting on the piston independent of the velocity of the piston in the pressure tube. Other, more elaborate systems, can generate variable damping forces during rebound and compression movements of the hydraulic actuator regardless of the position and movement of the piston in the pressure tube.

The movement produced in the hydraulic actuators in both the passive and active suspension systems converts mechanical energy and this mechanical energy is changed into heat of the hydraulic actuator's fluid and the components of the actuator.

SUMMARY

This section provides a general summary of the disclosure, and is not a comprehensive disclosure of its full scope or all of its features.

The present disclosure provides the art with a system which captures the energy generated in a passive suspension system. The energy is captured in a way that the energy can be reused later, or the energy can be converted into another form of energy such as electrical energy.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
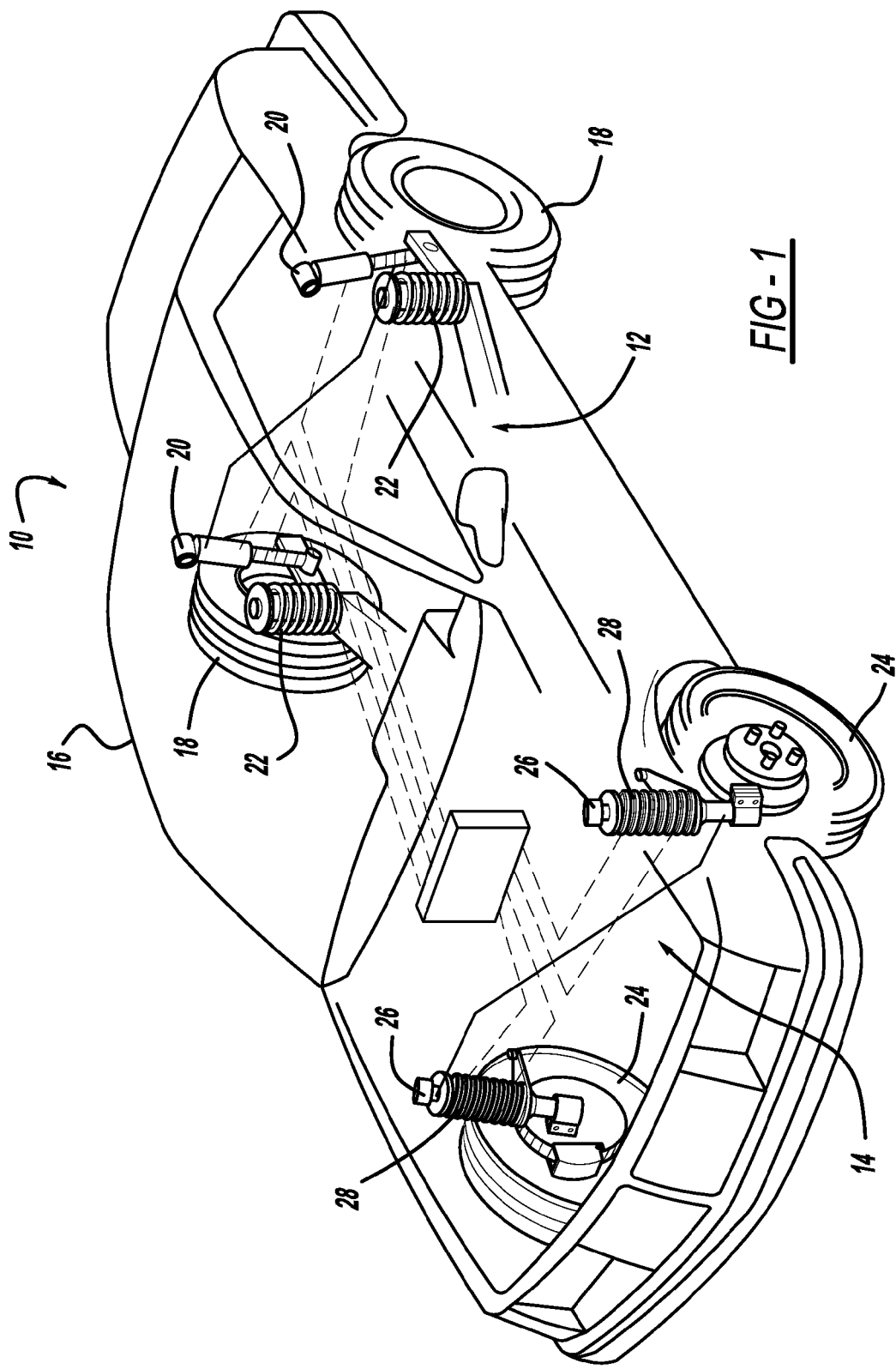
FIG. 1 is a diagrammatic illustration of a vehicle incorporating the active energy harvesting suspension system in accordance with the present disclosure.

The following description is merely exemplary in nature and is not intended to limit the present disclosure, application, or uses. There is shown in FIG. 1, a vehicle incorporating an active energy harvesting suspension system in accordance with the present disclosure and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18. The rear axle is attached to body 16 by means of a pair of active energy harvesting devices 20 and by a pair of springs 22. Similarly, front suspension 14 includes a transversely extending front axle assembly (not shown) to operatively support a pair of front wheels 24. The front axle assembly is attached to body 16 by means of a pair of active energy harvesting devices 26 and by a pair of springs 28. Active energy harvesting devices 20 and 26 serve to dampen the relative motion of the unsprung portion (i.e., front and rear suspensions 12, 14) with respect to the sprung portion (i.e., body 16) of vehicle 10. Sensors (not shown), at each wheel 18 and each wheel 24, sense the position and/or the velocity and/or the acceleration of body 16 in relation to rear suspension 12 and front suspension 14. While vehicle 10 has been depicted as a passenger car having front and rear axle assemblies, active energy harvesting devices 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "hydraulic actuator" as used herein is meant to refer to shock absorbers and hydraulic dampers in general and thus will include McPherson struts and other hydraulic damper designs known in the art.

Figure 2:
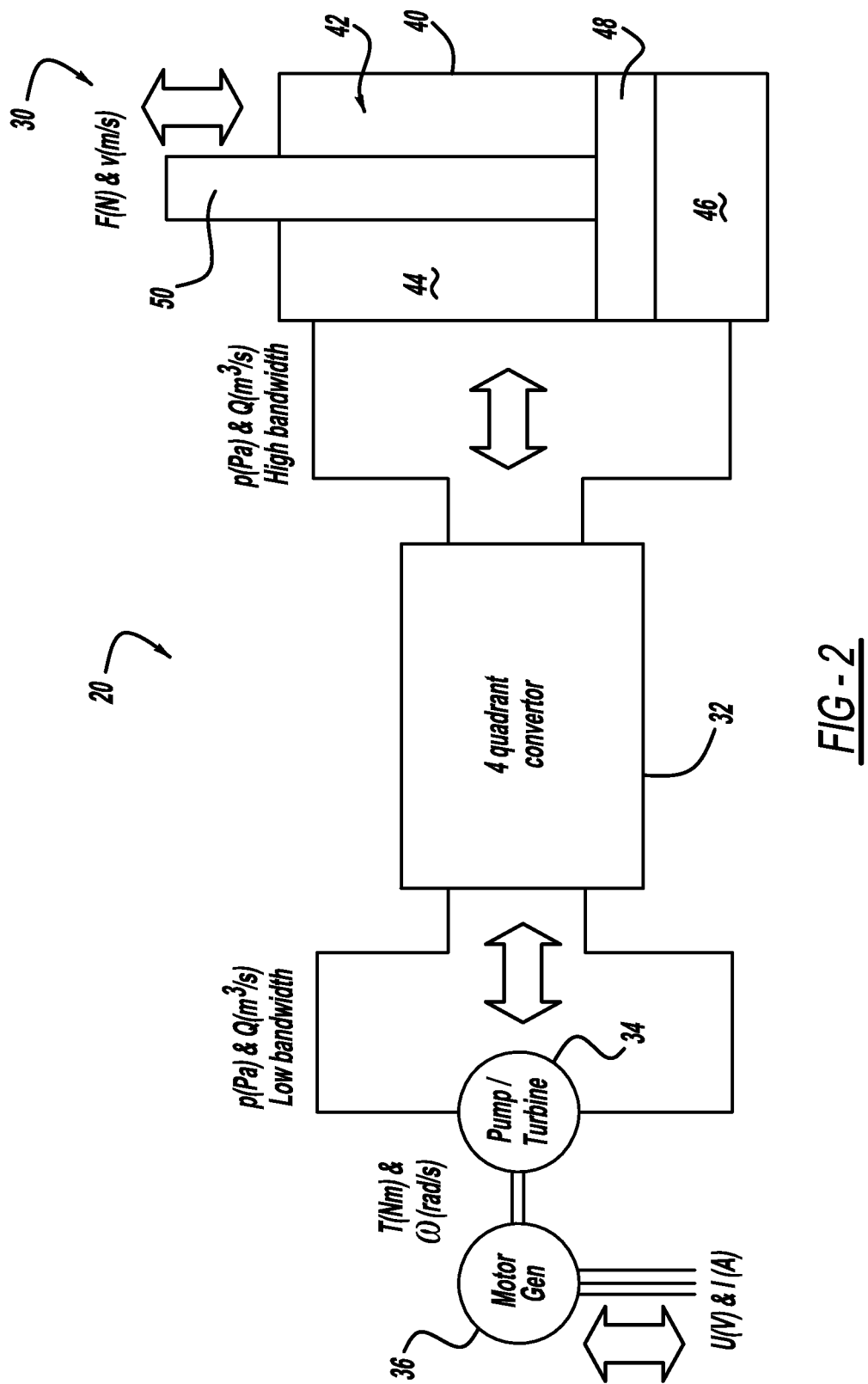
FIG. 2 is a schematic view of one of the active energy harvesting devices illustrated in FIG. 1.

Referring to FIG. 2, one of active energy harvesting devices 20 is illustrated schematically. While FIG. 2 only illustrates active energy harvesting device 20, active energy harvesting devices 26 include the same components discussed below for active energy harvesting device 20. The only difference between active energy harvesting devices 20 and 26 may be the way in which the active energy harvesting device is attached to the sprung and/or unsprung portion of the vehicle.

Active energy harvesting device 20 comprises a hydraulic actuator 30, a four quadrant convertor assembly 32, a pump/turbine 34 and a motor/generator 36. Four quadrant convertor assembly 32, pump/turbine 34 and motor/generator 36 define means for recuperating energy. Hydraulic actuator 30 comprises a pressure tube 40 having a fluid chamber 42 that is divided into an upper working chamber 44 and a lower working chamber 46 by a piston assembly 48. Piston assembly 48 is slidingly received within pressure tube 40 and piston assembly 48 includes a piston rod 50 that extends through upper working chamber 44 and is attached to the sprung portion of vehicle 10. Pressure tube 40 is attached to the unsprung portion of vehicle 10.

Figure 3:
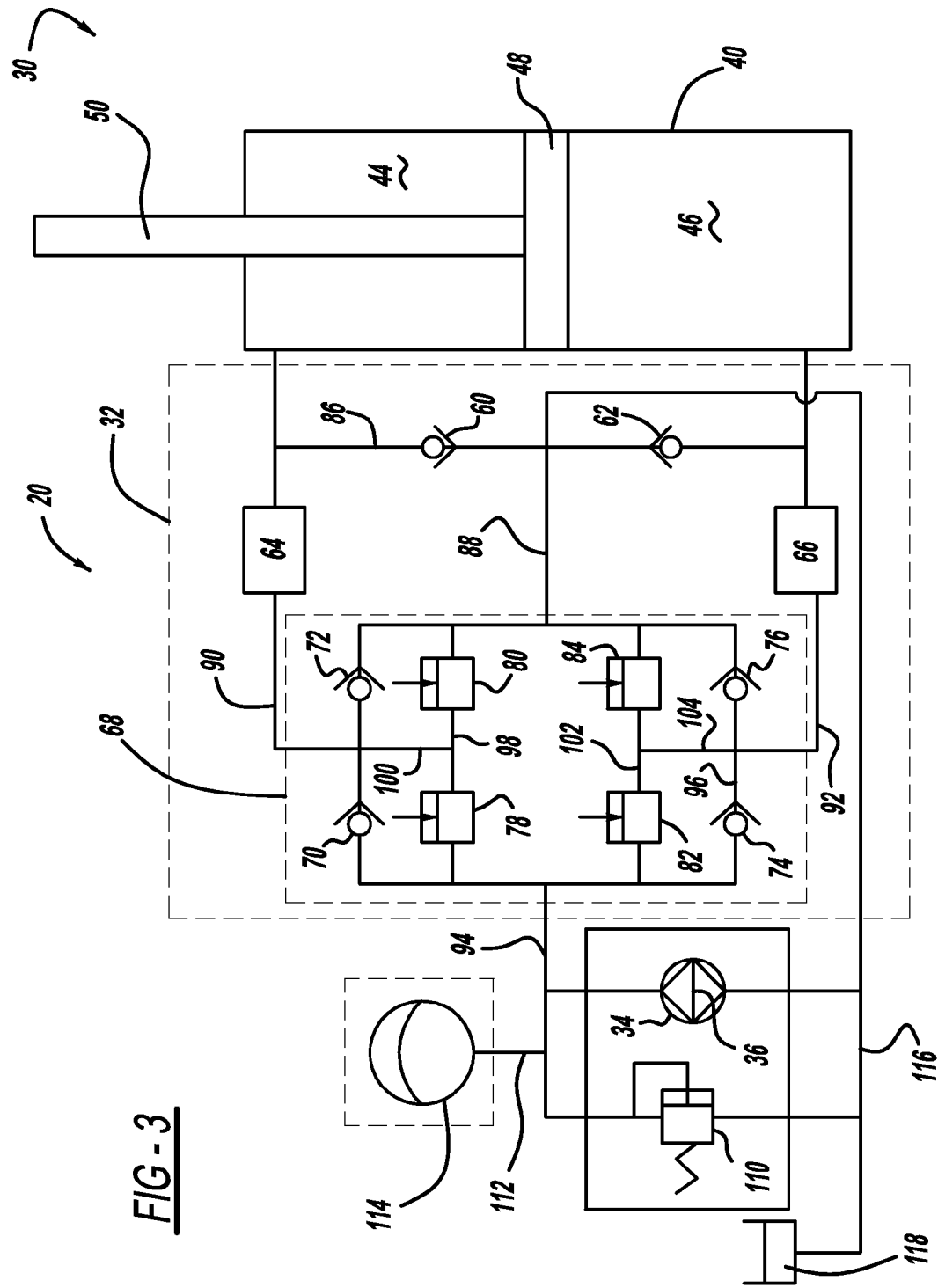
FIG. 3 is a schematic view of the active energy harvesting device illustrated in FIG. 2 illustrating the components of the active energy harvesting device.

Referring now to FIG. 3, four quadrant convertor assembly 32 comprises a pair of check valves 60, 62, a pair of hydraulic inductance units 64, 66 and a four quadrant convertor 68. Four quadrant convertor 68 comprises four check valves 70, 72, 74 and 76 and four two state valves 78, 80, 82 and 84.

Check valves 60 and 62 are disposed in a fluid line 86 which extends between upper working chamber 44 and lower working chamber 46. A fluid line 88 extends from fluid line 86 at a position between check valve 60 and 62 to four quadrant convertor 68. Check valve 60 prohibits fluid flow from upper working chamber 44 to fluid line 88 but allows fluid flow from fluid line 88 to upper working chamber 44. Check valve 62 prohibits fluid flow from lower working chamber 46 to fluid line 88 but allows fluid flow from fluid line 88 to lower working chamber 46.

Hydraulic inductance unit 64 is disposed within a fluid line 90 which extends between fluid line 86 where it is in communication with upper working chamber 44 and four quadrant convertor 68. Hydraulic inductance unit 66 is disposed within a fluid line 92 which extends between fluid line 86 where it is in communication with lower working chamber 46 and four quadrant convertor 68. A fluid line 94 extends between four quadrant convertor 68 and pump/turbine 34.

Four quadrant convertor 68 includes a fluid line 96 within which check valves 70, 72, 74 and 76 are disposed. Fluid line 88 connects to fluid line 96 at a position between check valves 72 and 76. Fluid line 90 connects to fluid line 96 at a position between check valves 70 and 72. Fluid line 92 connects to fluid line 96 at a position between check valves 74 and 76. Fluid line 94 connects to fluid line 96 at a position between check valves 70 and 74. Check valve 70 allows fluid flow from fluid line 90 to fluid line 94 but prohibits fluid flow from fluid line 94 to fluid line 90. Check valve 72 allows fluid flow from fluid line 88 to fluid line 90 but prohibits fluid flow from fluid line 90 to fluid line 88. Check valve 74 allows fluid flow from fluid line 92 to fluid line 94 but prohibits fluid flow from fluid line 94 to fluid line 92. Check valve 76 allows fluid flow from fluid line 88 to fluid line 92 but prohibits fluid flow from fluid line 92 to fluid line 88. Both the combination of check valves 70 and 72 and the combination of check valves 74 and 76 allow fluid flow from fluid line 88 to fluid line 94 but prohibit fluid flow from fluid line 94 to fluid line 88.

Two state valves 78 and 80 are disposed in a fluid line 98 which extends from fluid line 96 at a position between check valves 70 and 74 to fluid line 96 at a position between check valves 72 and 76. A fluid line 100 extends from fluid line 98 at a position between the two state valves 78 and 80 to fluid line 96 at a position between check valves 70 and 72 where fluid line 100 is also in communication with fluid line 90. Two state valves 82 and 84 are disposed in a fluid line 102 which extends from fluid line 96 at a position between check valves 70 and 74 to fluid line 96 at a position between check valves 72 and 76. A fluid line 104 extends from fluid line 102 at a position between the two state valves 82 and 84 to fluid line 96 at a position between check valves 74 and 76 where fluid line 104 is also in communication with fluid line 92.

Fluid line 94 is connected to one side of pump/turbine 34 and to one side of a two state valve 110. A fluid line 112 connects an accumulator 114 to fluid line 94. The opposite ends of pump/turbine 34 and two state valve 110 are connected to a fluid line 116 which extends from a fluid reservoir 118 to fluid line 86 at a position between check valves 60 and 62 where fluid line 116 is also in communication with fluid line 88.

Motor/generator 36 is mechanically connected to pump/turbine 34. When motor/generator 36 is used as a motor, motor/generator 36 will operate pump/turbine 34 to pump fluid in active energy harvesting device 20. When motor/generator 36 is used as a generator, fluid within active energy harvesting device 20 will drive pump/turbine 34 which will in turn drive motor/generator 36 to generate electrical energy. The accumulator 114 can also be used to store hydraulic energy.

As illustrated in FIG. 2, active energy harvesting device 20 provides for the capturing of incoming energy in a way that the energy can be reused later or in a way that the energy can be converted into another form of energy. Active energy harvesting device 20 can also control the forces in hydraulic actuator 30 in both an active and a passive mode. FIG. 2 illustrates a layout of coupling through a hydraulic medium. Forces on and motion of wheel 18 of vehicle 10 are converted into pressures and flows of the hydraulic fluid which in turn are converted into torque and speed at pump/turbine 34. Motor/generator 36 converts this energy into electrical energy. An additional advantage of the present disclosure is that energy flow in the opposite direction is also possible. Motor/generator 36 can be driven by electrical energy to drive the motion of hydraulic actuator 30.

Typically, the motion energy provided to wheel 18 from road contact is high frequency. This poses inertia limitations on pump/turbine 34 and motor/generator 36. These limitations affect the ability of pump/turbine 34 and motor/generator 36 to handle the hydraulic power needed. This issue can be resolved by separating the high bandwidth side from the low bandwidth side by the use of four quadrant convertor 68.

Four quadrant convertor 68 separates a semi-fixed pressure level at accumulator 114 to the high frequency side of hydraulic actuator 30. Valves 78, 80, 82 and 84 are two state valves, on or off, in order to prevent large amounts of hydraulic losses. The hydraulic bursts caused by the switching of valves 78, 80, 82 and 84 are smoothened in accumulator 114 and hydraulic inductance units 64 and 66. Accumulator 114 smoothens the pressure drops caused by the switching of valves 78, 80, 82 and 84 and accumulator 114 provides enough flow to drive hydraulic actuator 30. Hydraulic inductance units 64 and 66 smoothen the flow of fluid to hydraulic actuator 30 and decouple the pressure in accumulator 114 from the pressures in the upper and lower working chambers 44 and 46 of hydraulic actuator 30.

Energy can be delivered to or retracted from accumulator 114 by means of motor/generator 36. Two state valve 110 is a pressure control valve that secures the various hydraulic fluid storage components of active energy harvesting device 20 for peak fluid pressures.

Figure 4:
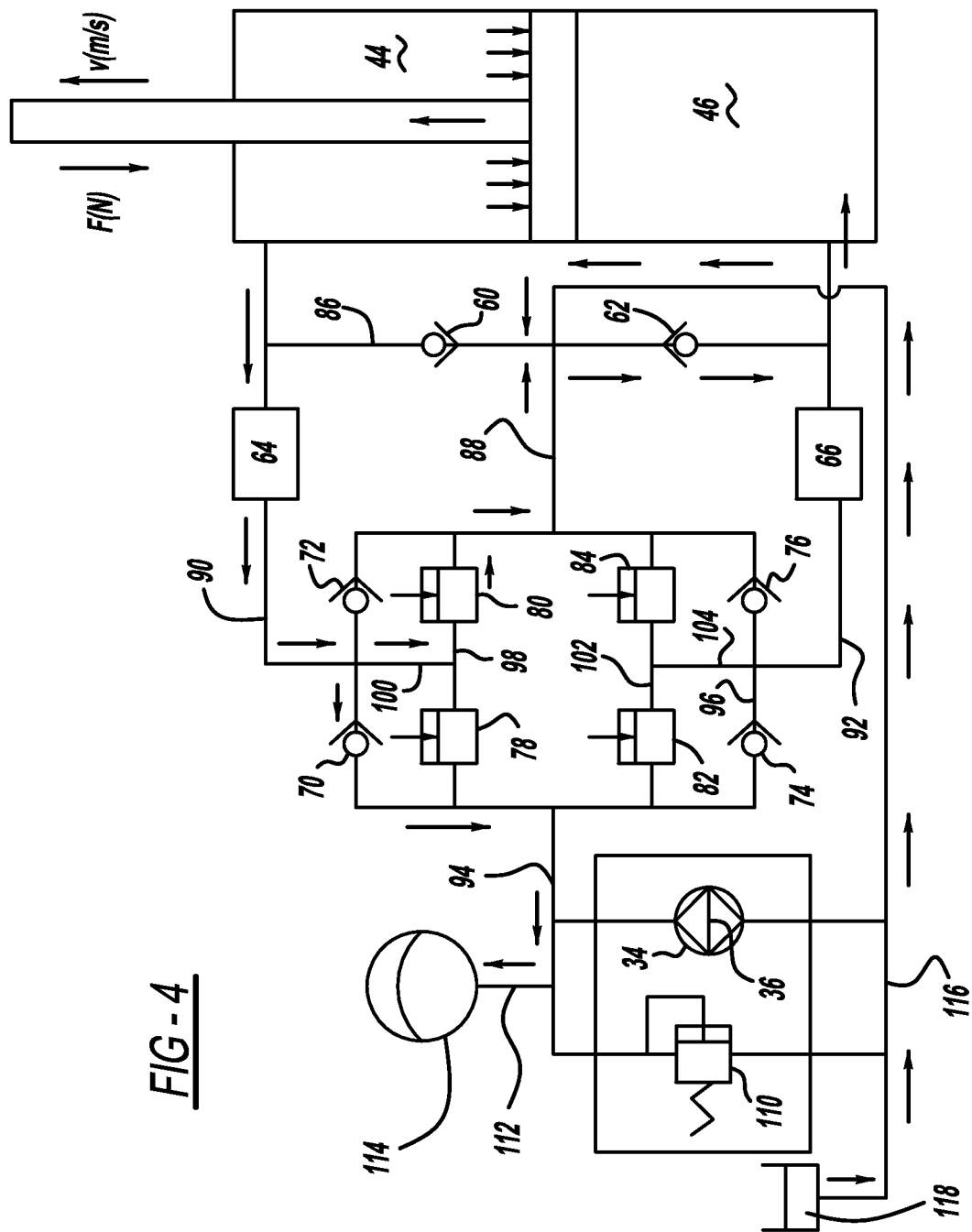
FIG. 4 is a schematic view of the active energy harvesting device illustrated in FIG. 3 showing fluid flow during a passive rebound mode of the active energy harvesting device.

During a rebound stroke in the passive mode as illustrated in FIG. 4, check valve 62 allows fluid to flow into lower working chamber 46. On the upper side of piston assembly 48, fluid pressure is created in upper working chamber 44 by the upward movement of piston assembly 48. Depending on the damping characteristic, fluid flow flows through hydraulic inductance unit 64. When two state valve 80 is open, the flow rate increases as determined by the applied external force and the inductance constant of hydraulic inductance unit 64. In order to reach a specific pressure in upper working chamber 44, a specific duty cycle is applied to two state valve 80. When two state valve 80 is closed, hydraulic inductance unit 64 continues the existing flow through check valve 70 at a decreasing rate. The flow through check valve 70 is directed to accumulator 114. The flow through two state valve 80 is directed through check valve 62 and into lower working chamber 46. Additional fluid required in lower working chamber 46 is provided by fluid reservoir 118 through fluid line 116, through check valve 62 and into lower working chamber 46. These various flows are illustrated by the arrows in FIG. 4. Thus, the pressure in upper working chamber 44 can be regulated and excess energy is recuperated.

Figure 5:
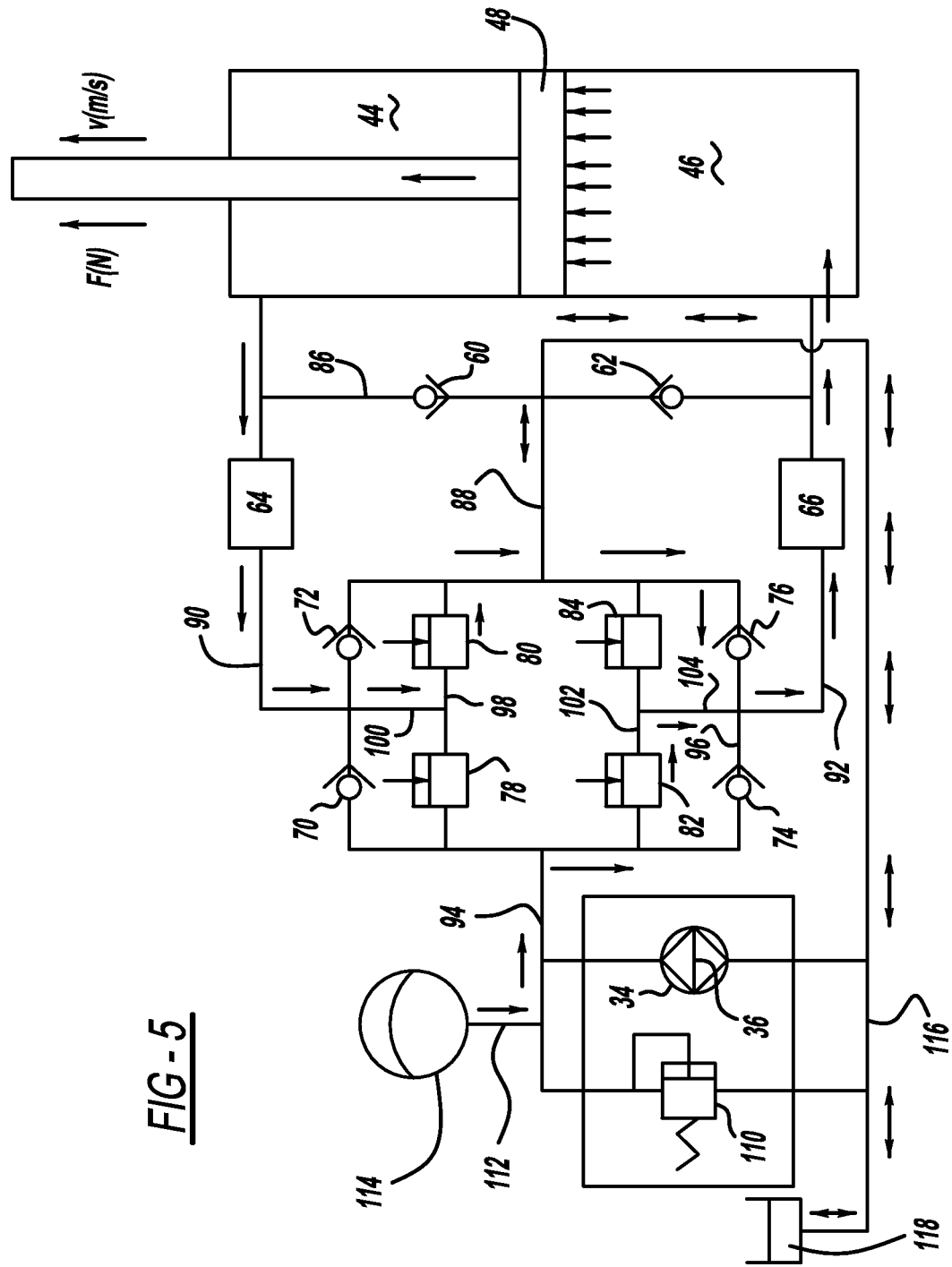
FIG. 5 is a schematic view of the active energy harvesting device illustrated in FIG. 3 showing fluid flow during an active rebound operation mode.

During a rebound stroke in the active mode as illustrated in FIG. 5, check valve 76 and hydraulic inductance unit 66 allow fluid to flow into lower working chamber 46. On the lower side of piston assembly 48, fluid pressure is applied to lower working chamber 46 causing upward movement of piston assembly 48. Depending on the damping characteristics, fluid flows through hydraulic inductance unit 64. Two state valve 80 is continuously open to allow fluid flow out of upper working chamber 44 through hydraulic inductance unit 64, through two state valve 80 and either through check valve 76, through hydraulic inductance unit 66 and into lower working chamber 46 or through fluid line 88, through fluid line 116 and into fluid reservoir 118 depending on the amount of force required. In order to reach a specific pressure within lower working chamber 46, a specific duty cycle is applied to two state valve 82. When two state valve 82 is closed, hydraulic inductance unit 64 continues the existing flow through two state valve 80, through check valve 76, through hydraulic inductance unit 66 and into lower working chamber 46. When two state valve 82 is open, fluid flow is allowed from accumulator 114, through two state valve 82, through hydraulic inductance unit 66 and into lower working chamber 46. Additional fluid required for lower working chamber 46 is provided by fluid reservoir 118 through fluid line 116, through check valve 76, through hydraulic inductance unit 66 and into lower working chamber 46. These various flows are illustrated by the arrows in FIG. 5. Thus, the pressure in lower working chamber 46 can be regulated using the excess energy stored in accumulator 114.

Figure 6:
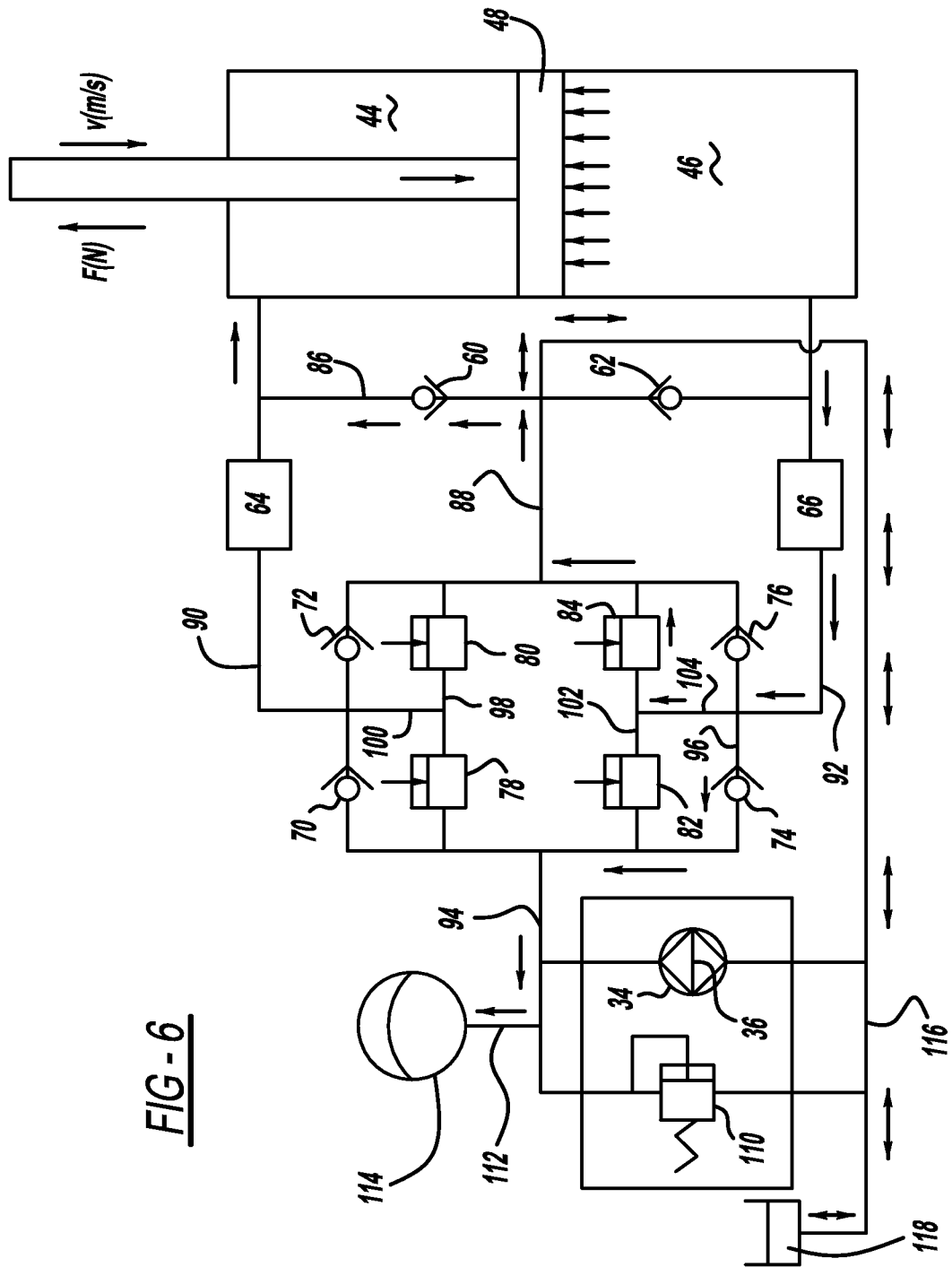
FIG. 6 is a schematic view of the active energy harvesting device illustrated in FIG. 3 showing fluid flow during a passive compression mode of the active energy harvesting device.

During a compression stroke in the passive mode as illustrated in FIG. 6, check valve 60 allows fluid to flow into upper working chamber 44. On the lower side of piston assembly 48, fluid pressure is created in lower working chamber 46 by the downward movement of piston assembly 48. Depending on the damping characteristic, fluid flow flows through hydraulic inductance unit 66. When two state valve 84 is open, the flow rate increases as determined by the applied external force and the inductance constant of hydraulic inductance unit 66. In order to reach a specific pressure in lower working chamber 46, a specific duty cycle is applied to two state valve 84. When two state valve 84 is closed, hydraulic inductance unit 66 continues the existing flow through check valve 74 at a decreasing rate. The flow through check valve 74 is directed to accumulator 114. The flow through two state valve 84 is directed either through check valve 60 and into upper working chamber 44 or through fluid line 116 to fluid reservoir 118 depending on the amount of force required. Additional fluid required in upper working chamber 44 is provided by fluid reservoir 118 through fluid line 116, through check valve 60 and into upper working chamber 44. These various flows are illustrated by the arrows in FIG. 6. Thus, the pressure in lower working chamber 46 can be regulated and excess energy is recuperated.

Figure 7:
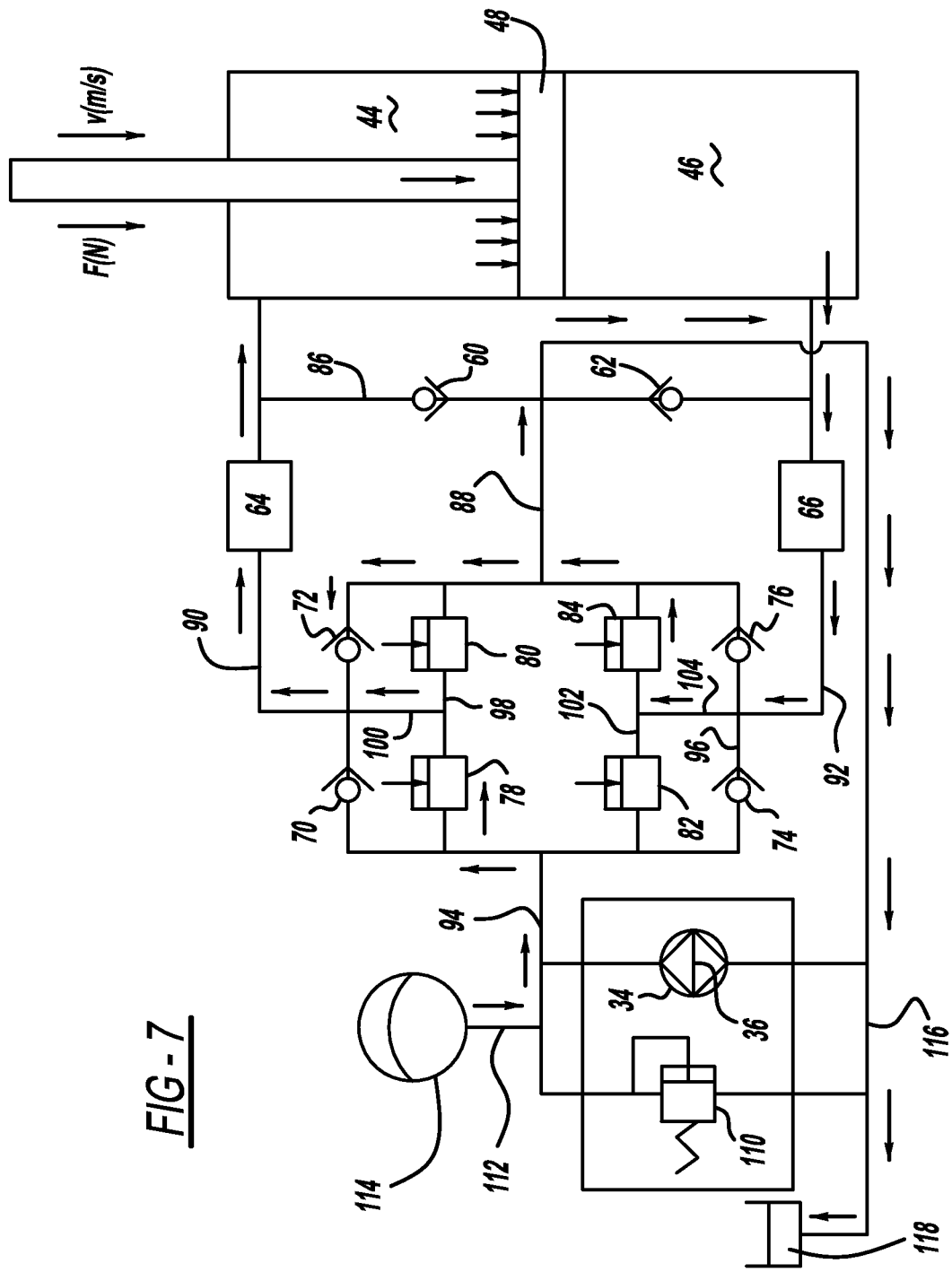
FIG. 7 is a schematic view of the active energy harvesting device illustrated in FIG. 3 showing fluid flow during an active compression operation mode.

During a compression stroke in the active mode as illustrated in FIG. 7, check valve 72 and hydraulic inductance unit 64 allow fluid to flow into upper working chamber 44. On the lower side of piston assembly 48, fluid pressure is created in lower working chamber 46 by the downward movement of piston assembly 48. Depending on the damping characteristics, fluid flows through hydraulic inductance unit 66. Two state valve 84 is continuously open to allow fluid flow out of lower working chamber 46 through hydraulic inductance unit 66, through two state valve 84, through check valve 72, through hydraulic inductance unit 64 and into upper working chamber 44. In order to reach a specific pressure within upper working chamber 44, a specific duty cycle is applied to two state valve 78. When two state valve 78 is closed, hydraulic inductance unit 66 continues the existing flow through two state valve 84, through check valve 72, through hydraulic inductance unit 64 and into upper working chamber 44. When two state valve 78 is open, fluid flow is allowed from accumulator 114, through two state valve 78, through hydraulic inductance unit 64 and into upper working chamber 44. Additional fluid from lower working chamber 46 is directed to fluid reservoir 118 through fluid line 88 and fluid line 116. These various flows are illustrated by the arrows in FIG. 7. Thus, the pressure in upper working chamber 44 can be regulated using the excess energy stored in accumulator 114.

While the above discussion illustrates the reuse of the energy stored in the passive mode during the active mode, the energy stored in accumulator 114 can be directed through pump/turbine 34 and into fluid reservoir 118. The fluid flowing through pump/turbine 34 will drive pump/turbine 34 which will in turn drive motor/generator 36 which can be used as a generator to generate electrical power. Also, when the fluid pressure in accumulator 114 is below a specified pressure, motor/generator 36 can be driven by electrical power to operate pump/turbine 34 and pump hydraulic fluid from fluid reservoir 118 to accumulator 114.

The above system allows for full four quadrant operation. The system can send and retrieve energy from and to hydraulic actuator 30 is both rebound and compression movements of hydraulic actuator 30. In the above system, pump/turbine 34 only has to provide energy to the system when the pressure in accumulator 114 is below a specified pressure. In prior art active systems, a pump has to constantly provide pressure to the system.

Figure 8:
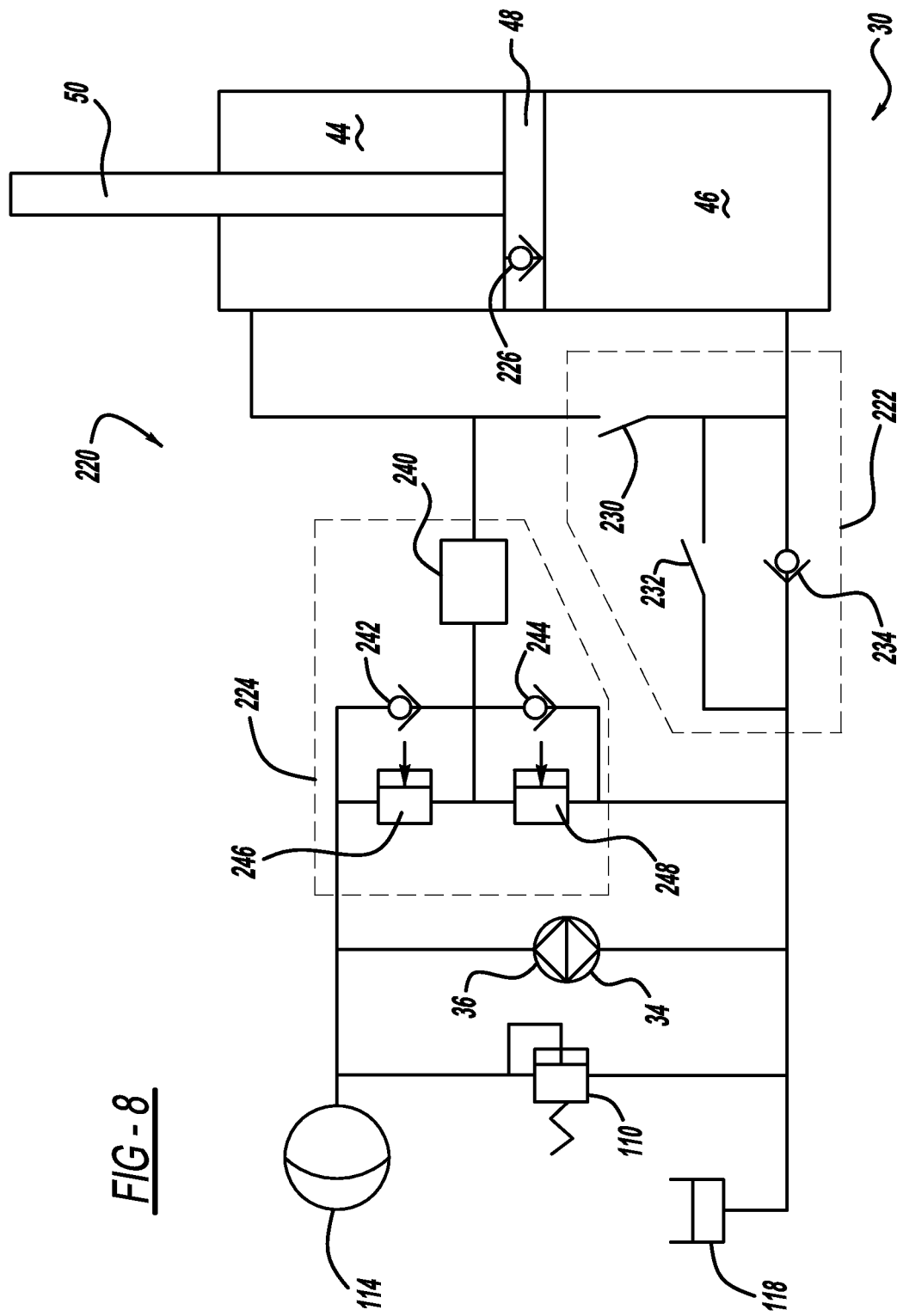
FIG. 8 is a diagrammatic illustration of an active energy harvesting suspension system in accordance with another embodiment of the present disclosure.

Referring now to FIG. 8, an active energy harvesting device 220 in accordance with another embodiment of the present disclosure is illustrated. Active energy harvesting device 220 can replace active energy harvesting device 20 or active energy harvesting device 26. Active energy harvesting device 220 comprises hydraulic actuator 30, pump/turbine 34, motor/generator 36, two state valve 110, accumulator 114, fluid reservoir 118, operational valve system 222, pressure regulation system 224 and a check valve 226 disposed within piston assembly 48. Pump/turbine 34, motor/generator 36, operational valve system 222 and pressure regulation system 224 define means for recuperating energy.

Operation valve system 222 comprises a pair of valves 230, 232 and a check valve 234. Pressure regulation system 224 comprises a hydraulic inductance unit 240, a pair of check valves 242 and 244 and a pair of two state valves 246 and 248. Fluid lines as illustrated in FIG. 8 fluidly connect the various components of active energy harvesting device 220.

Figure 9:
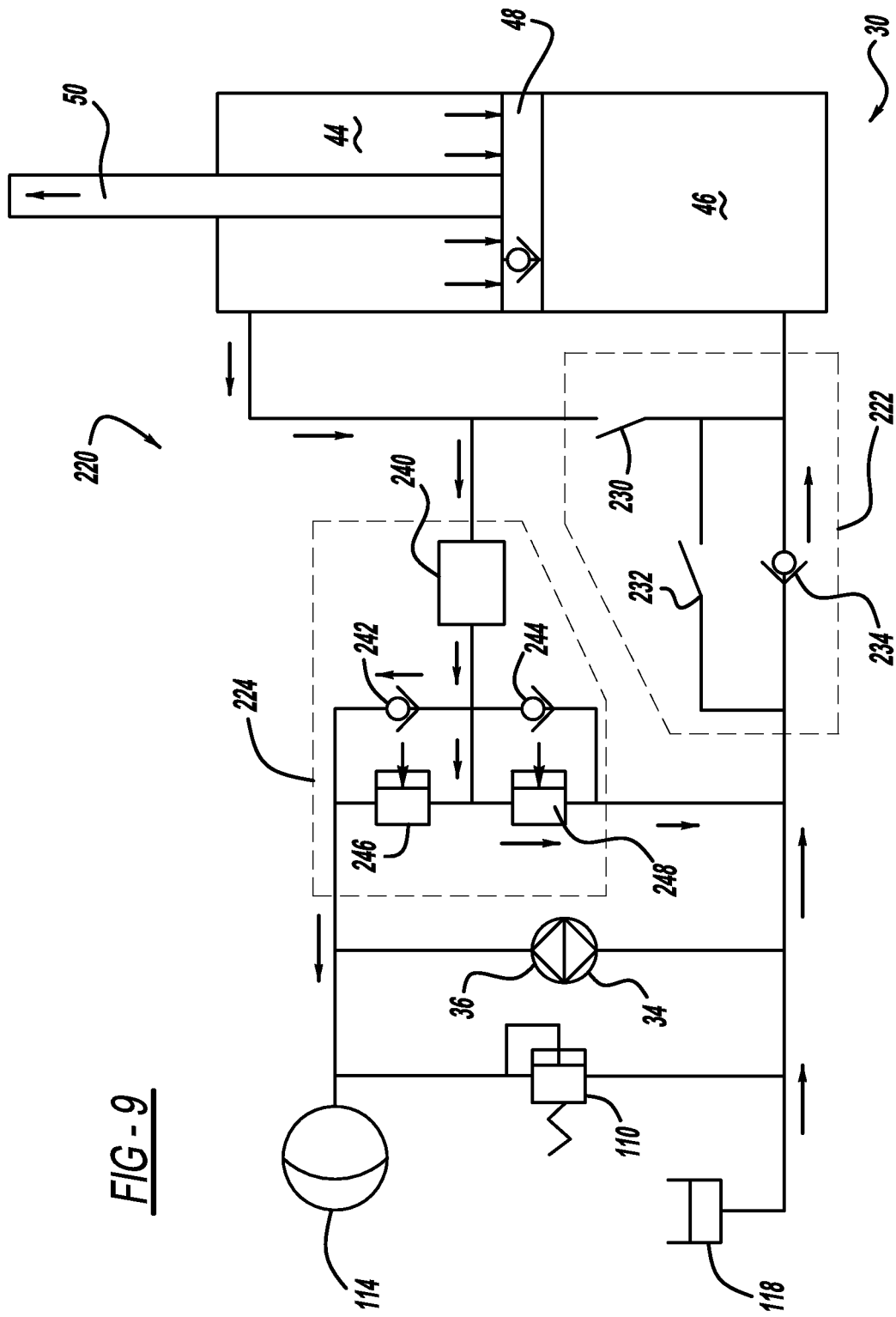
FIG. 9 is a schematic view of the active energy harvesting device illustrated in FIG. 8 showing fluid flow during a passive rebound mode of the active energy harvesting device.

During a rebound stroke in the passive mode as illustrated in FIG. 9, check valve 234 allows fluid to flow into lower working chamber 46. On the upper side of piston assembly 48, fluid pressure is created in upper working chamber 44 by the upward movement of piston assembly 48. Fluid flows from upper working chamber 44 through hydraulic inductance unit 240. When two state valve 248 is open, the flow rate increases determined by the applied external forces and the inductance constant of hydraulic inductance unit 240. In order to reach a specific pressure in upper working chamber 44, a specific duty cycle is applied to two state valve 248. When two state valve 248 is closed, hydraulic inductance unit 240 continues the existing flow through check valve 242 at a decreasing rate. The flow through check valve 242 is directed to accumulator 114. Two state valve 246 is placed in a closed position. The flow through two state valve 248 is directed through check valve 234 and into lower working chamber 46. Additional fluid flow required in lower working chamber 46 is provided by fluid reservoir 118 through check valve 234 and into lower working chamber 46. Valves 230 and 232 remain open in this operating mode. Thus, the pressure in upper working chamber 44 can be regulated and excess energy is recuperated.

Figure 10:
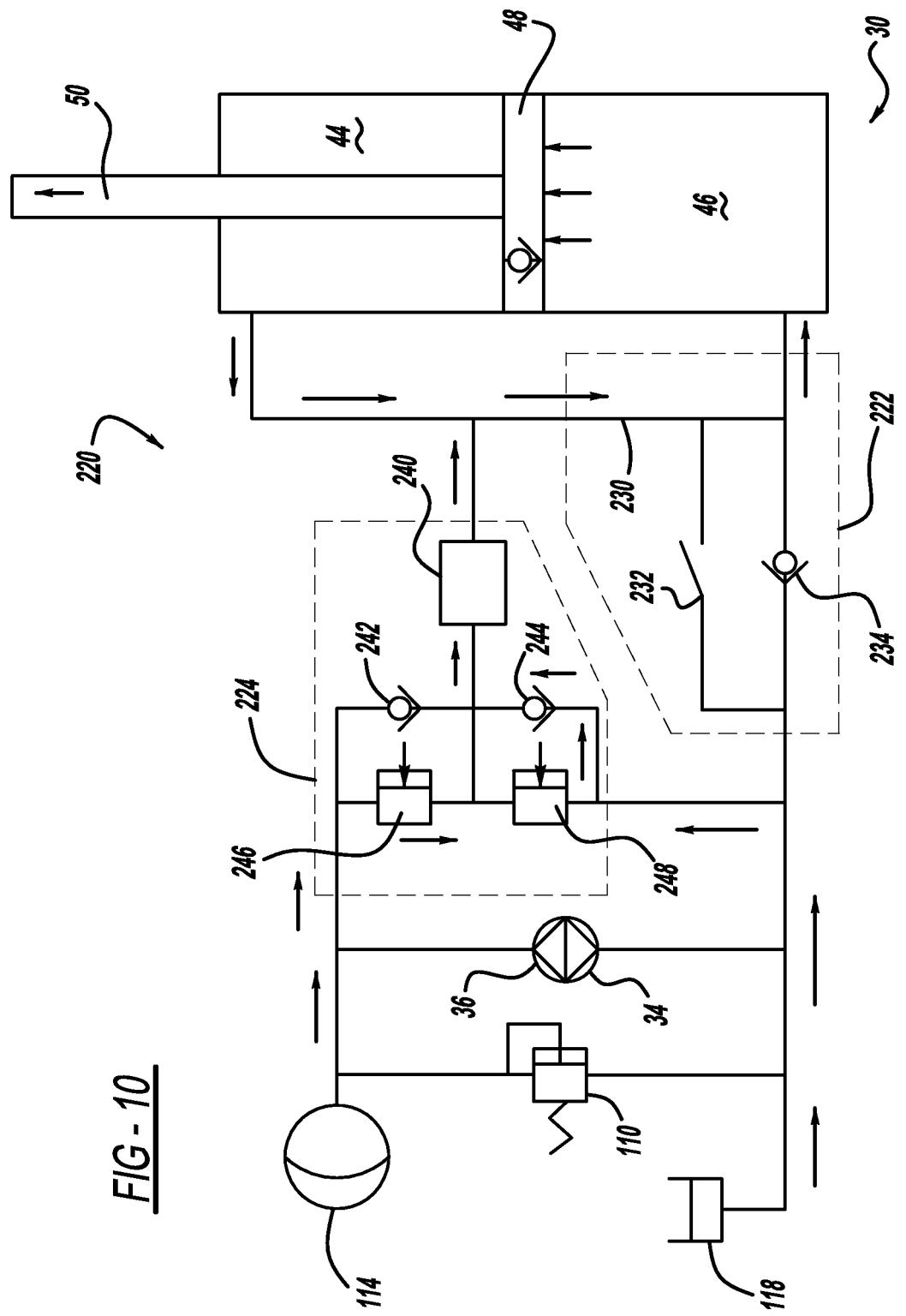
FIG. 10 is a schematic view of the active energy harvesting device illustrated in FIG. 8 showing fluid flow during an active rebound operation mode of the active energy harvesting device.

During a rebound stroke in the active mode as illustrated in FIG. 10, valve 230 is closed to allow fluid flow from upper working chamber 44 to lower working chamber 46. On the upper side of piston assembly 48, fluid pressure is created in upper working chamber 44 by the upward movement of piston assembly 48. Depending on the damping characteristics, fluid flows from upper working chamber 44 through valve 230 and into lower working chamber 46. In order to reach a specified pressure within lower working chamber 46, a specific duty cycle is applied to two state valve 246. When two state valve 246 is open, fluid flow is allowed from accumulator 114, through two state valve 246, through hydraulic inductance unit 240, through valve 230 and into lower working chamber 46. Additional fluid required for lower working chamber 46 is provided by fluid reservoir 118 through check valve 234 and/or through check valve 244 and hydraulic inductance unit 240. Thus, the pressure in lower working chamber 46 can be regulated using the excess energy stored in accumulator 114. Valve 232 is open in this mode and two state valve 248 is closed in this mode.

Figure 11:
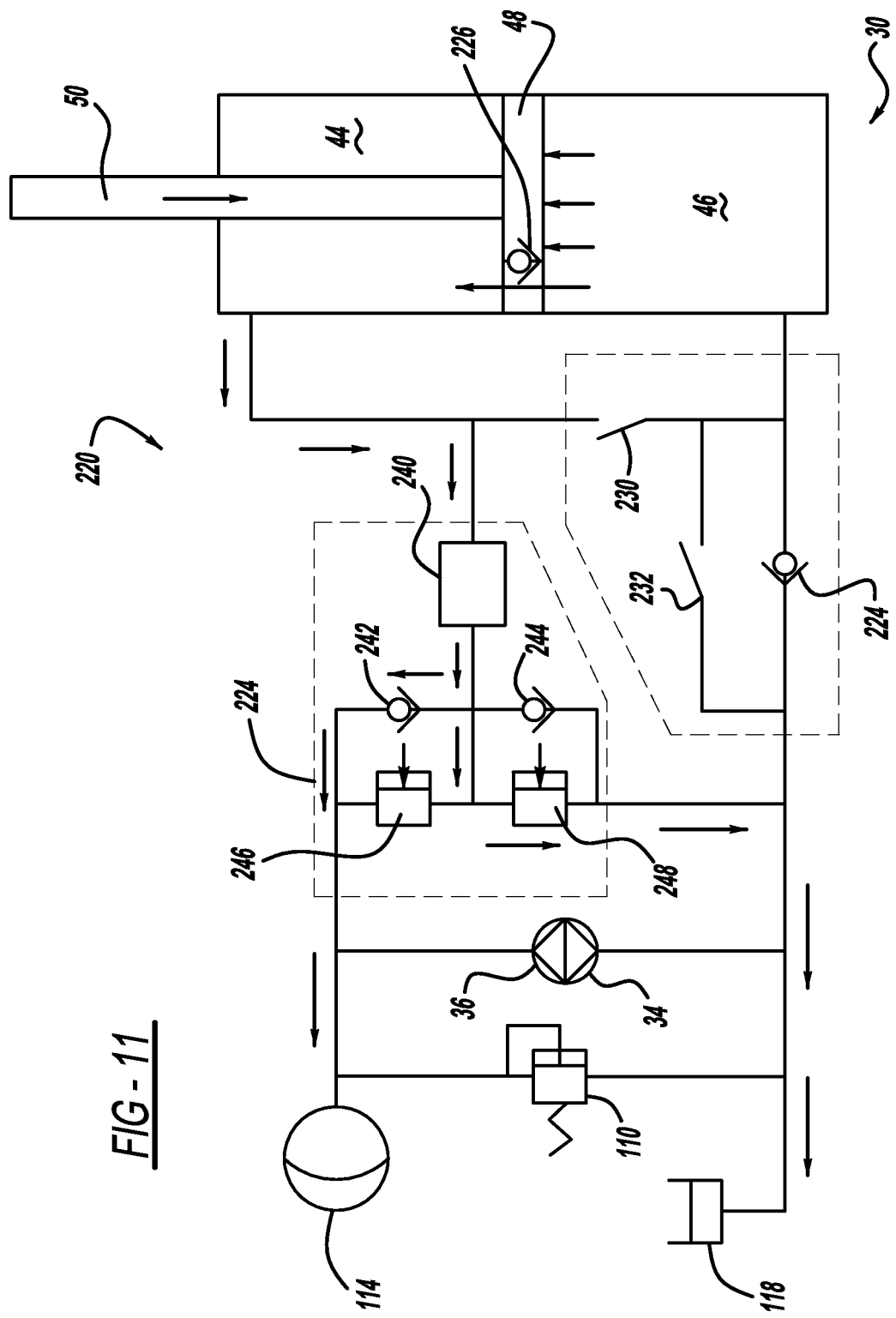
FIG. 11 is a schematic view of the active energy harvesting device illustrated in FIG. 8 showing fluid flow during a passive compression mode of the active energy harvesting device.

During a compression stroke in the passive mode as illustrated in FIG. 11, check valve 226 allows fluid to flow into upper working chamber 44 from lower working chamber 46. On the lower side of piston assembly 48, fluid pressure is created in lower working chamber 46 by the downward movement of piston assembly 48. Fluid flows from lower working chamber 46, through check valve 226, through upper working chamber 44, and through hydraulic inductance unit 240. When two state valve 248 is open, the flow rate increases as determined by the applied external forces and the inductance constant of hydraulic inductance unit 240. In order to reach a specific pressure in upper working chamber 44, a specific duty cycle is applied to two state valve 248. When two state valve 248 is closed, hydraulic inductance unit 240 continues the existing flow through check valve 242 at a decreasing rate. The flow through check valve 242 is directed to accumulator 114 through check valve 242. Two state valve 246 is placed in a closed position. The flow through two state valve 248 is directed into fluid reservoir 118. Valves 230 and 232 remain open in this operating mode. Thus, the pressure in upper working chamber 44 can be regulated and excess energy is recuperated.

Figure 12:
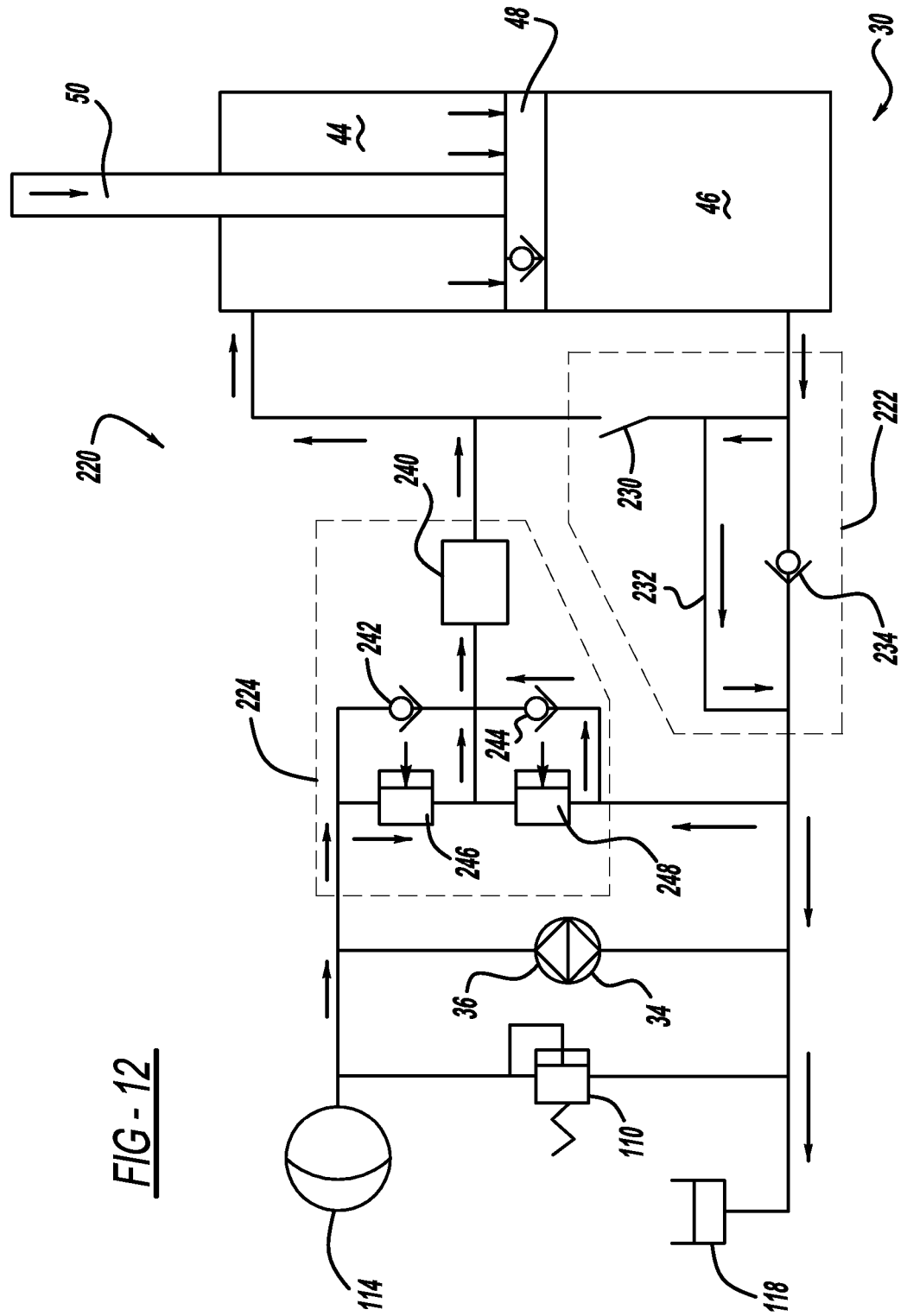
FIG. 12 is a schematic view of the active energy harvesting device illustrated in FIG. 8 showing fluid flow during an active compression operation mode of the active energy harvesting device.

During a compression stroke in the active mode as illustrated in FIG. 12, valve 232 is closed to allow fluid flow from lower working chamber 46 to fluid reservoir 118. On the lower side of piston assembly 48, fluid pressure is created in lower working chamber 46 by the downward movement of piston assembly 48. Depending on the damping characteristics, fluid flows from lower working chamber 46 through valve 232, through check valve 244, through hydraulic inductance unit 240 and into upper working chamber 44. In order to reach a specified pressure within upper working chamber 44, a specific duty cycle is applied to two state valve 246. When two state valve 246 is open, fluid flow is allowed from accumulator 114, through two state valve 246, through hydraulic inductance unit 240 and into upper working chamber 44. Thus, the pressure in upper working chamber 44 can be regulated using the excess energy stored in accumulator 114. Valve 230 and two state valve 248 are open in this mode.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An active energy harvesting system comprising:
    a pressure tube defining a fluid chamber;
    a piston slidingly disposed within the pressure tube, the piston dividing the fluid chamber into an upper working chamber and a lower working chamber;
    an energy recuperating subsystem for recuperating energy generated due to sliding movement of the piston, the energy recuperating subsystem being in fluid communication with the upper and lower working chambers, the energy recuperating subsystem including:
        a convertor assembly in fluid communication with the pressure tube, the convertor assembly including a first plurality of check valves and a convertor separate from and in fluid communication with the first plurality of check valves;
        the first plurality of check valves including a first check valve allowing fluid flow therethrough into the upper working chamber while prohibiting a flow of fluid flow therethrough out from the upper working chamber, and a second check valve allowing a flow of fluid therethrough into the lower working chamber while prohibiting a flow of fluid therethrough out from the lower working chamber; and
        a fluid responsive component in flow communication with the convertor assembly and the first and second check valves.

2. The system of claim 1, wherein the fluid responsive component comprises a turbine.

3. The system of claim 2, wherein the fluid responsive component further comprises a generator driven by the turbine, the generator adapted to generate an electrical output signal from a motive force provided by the turbine.

4. The system of claim 1, further comprising an accumulator in fluid communication with the converter, the accumulator configured to smooth changes in fluid pressure experienced during operation of system as the piston moves within the pressure tube.

5. The system of claim 1, further comprising a fluid reservoir in fluid communication with the convertor.

6. The system of claim 1, wherein the convertor further comprises:
    a second plurality of check valves; and
    a pair of state valves each able to be modulated independently of the other.

7. The system claim 6, wherein the upper working chamber is in fluid communication with a first one of the second plurality of check valves and also a first one of the pair of state valves.

8. The system of claim 6, wherein the lower working chamber is in fluid communication with a second one of the second plurality of check valves and also a second one of the pair of state valves.

9. The system of claim 6, further comprising an accumulator and a reservoir, and wherein the accumulator is in fluid communication with each one of the second plurality of check valves; and
    wherein the reservoir is in fluid communication with each one of the first plurality of check valves.

10. The system of claim 1, wherein the first and second check valves of the first plurality of check valves are arranged in opposite flow directions between the upper and lower working chambers, such that a fluid flow is only permitted through one or the other of the first and second check valves of the first plurality of check valves, but not simultaneously through both.

11. The system of claim 6, wherein the converter assembly further includes a pressure regulation system in flow communication with, and interposed between, the pressure tube and the converter.

12. The system of claim 11, wherein the pressure regulation system includes at least one hydraulic inductance unit communicating directly with the upper working chamber, and a first one of the second plurality of valves.

13. The system of claim 11, wherein the pressure regulation system includes at least one hydraulic inductance unit communicating directly with the lower working chamber and a second one of the second plurality of valves.

14. The system of claim 12, wherein the at least one hydraulic inductance unit is in direct communication with the first one of the second plurality of valves and also with a first one of the pair of state valves.

15. The system of claim 13, wherein the at least one hydraulic inductance unit is in direct communication with the second one of the second plurality of valves and also with a second one of the pair of state valves.

16. The system of claim 11, wherein the pressure regulation system includes:
    a first hydraulic inductance unit disposed in flow communication with the upper working chamber, and also with the first one of the second plurality of check valves and a first one of the pair of state valves; and
    a second hydraulic inductance unit disposed in flow communication with the lower working chamber, and also with a second one of the second plurality of check valves and a second one of the plurality of state valves.

17. An active energy harvesting system comprising:
    a pressure tube defining a fluid chamber;
    a piston slidingly disposed within the pressure tube, the piston dividing the fluid chamber into an upper working chamber and a lower working chamber;
    an energy recuperating subsystem for recuperating energy generated due to sliding movement of the piston, the energy recuperating subsystem being in fluid communication with the upper and lower working chambers, the energy recuperating subsystem including:
        a convertor assembly in fluid communication with the pressure tube, the convertor assembly including a plurality of check valves and a convertor separate from and in fluid communication with the plurality of check valves;
at least one hydraulic inductance unit interposed between one of the upper and lower working chambers and the converter, the hydraulic inductance unit operable to smooth a flow of fluid into at least one of the upper and lower working chambers of the pressure tube; and
a fluid responsive component in flow communication with the convertor assembly.

18. The system of claim 17, wherein the at least one hydraulic inductance unit comprises:
a first hydraulic inductance unit in direct communication with the upper working chamber of the pressure tube, which smooths a flow of fluid from the upper working chamber, through the converter assembly, and back into the lower working chamber; and
a second hydraulic inductance unit in direction communication with the lower working chamber of the pressure tube, which smooths a flow of fluid from the lower working chamber, through the converter assembly, and back into the upper working chamber.

19. The system of claim 17, wherein the fluid responsive component comprises a turbine.

20. The system of claim 17, further comprising an accumulator in fluid communication with the convertor assembly.

21. A method for recuperating energy in connection with operation of a pressure tube defining a fluid chamber, and where a piston is slidingly disposed within the pressure tube and the piston divides the fluid chamber into an upper working chamber and a lower working chamber, and the piston moves in a reciprocating motion during compression and rebound strokes, the method comprising:
using a convertor assembly in fluid communication with the pressure tube, and having a plurality of check valves and a convertor separate from and in fluid communication with the plurality of check valves, to receive a fluid flow from at least one of the upper and lower working chambers as the piston moves slidingly within the pressure tube;
using the plurality of check valves, which includes a first check valve, to allow a fluid flow through the first check valve into the upper working chamber while prohibiting a flow of fluid flow therethrough out from the upper working chamber, and using a second check valve of the plurality of check valves to allow a flow of fluid therethrough into the lower working chamber while prohibiting a flow of fluid therethrough out from the lower working chamber; and
using a fluid responsive component in flow communication with the convertor assembly and the first and second check valves to assist in harvesting energy from fluid flows created by sliding motion of the piston.

* * * * *